(12) United States Patent
Hirabayashi et al.

(10) Patent No.: US 11,795,307 B2
(45) Date of Patent: Oct. 24, 2023

(54) RUBBER COMPOSITION FOR TIRE, AND TIRE

(71) Applicant: Toyo Tire Corporation, Itami (JP)

(72) Inventors: Kazuya Hirabayashi, Itami (JP); Norio Minouchi, Itami (JP)

(73) Assignee: Toyo Tire Corporation, Itami (JP)

( * ) Notice: Subject to any disclaimer, the term of this patent is extended or adjusted under 35 U.S.C. 154(b) by 41 days.

(21) Appl. No.: 17/540,751

(22) Filed: Dec. 2, 2021

(65) Prior Publication Data

US 2022/0195152 A1     Jun. 23, 2022

(30) Foreign Application Priority Data

Dec. 18, 2020   (JP) .................................. 2020-210755

(51) Int. Cl.
*C08L 9/06*   (2006.01)
*C08K 9/04*   (2006.01)
*C08K 3/36*   (2006.01)
*C08K 3/04*   (2006.01)
*B60C 1/00*   (2006.01)
*B60C 11/00*  (2006.01)
*C08K 5/01*   (2006.01)

(52) U.S. Cl.
CPC .............. *C08L 9/06* (2013.01); *B60C 1/0016* (2013.01); *B60C 11/0008* (2013.01); *C08K 3/041* (2017.05); *C08K 3/36* (2013.01); *C08K 5/01* (2013.01); *C08K 9/04* (2013.01); *B60C 2011/0025* (2013.01); *C08L 2205/03* (2013.01)

(58) Field of Classification Search
CPC .... C08L 9/06; C08K 3/36; C08K 9/04; C08K 5/01; C08K 3/04
USPC .......................................................... 523/156
See application file for complete search history.

(56) References Cited

U.S. PATENT DOCUMENTS

2015/0203668 A1* 7/2015 Bedard ................... C08L 23/16
                                                         523/156
2018/0171115 A1* 6/2018 Sagitani .................. C08L 9/00

FOREIGN PATENT DOCUMENTS

| EP | 2168914 A1 * | 3/2010 | ............. B82Y 30/00 |
| JP | 2009-102630 A | 5/2009 | |
| JP | 2010-275376 A | 12/2010 | |
| JP | 2012-167216 A | 9/2012 | |
| JP | 6499781 B1 | 4/2019 | |

* cited by examiner

*Primary Examiner* — Deve V Hall
(74) *Attorney, Agent, or Firm* — WHDA, LLP

(57) ABSTRACT

A rubber composition for tires according to an embodiment is produced by kneading a diene rubber, silica, and a granular carbon nanotube prepared as a binder-coated, granulated carbon nanotube. A tire according to an embodiment comprises the rubber composition.

10 Claims, No Drawings

RUBBER COMPOSITION FOR TIRE, AND TIRE

CROSS-REFERENCE TO RELATED APPLICATIONS

This application is based upon and claims the benefit of priority from the prior Japanese Patent Application No. 2020-210755, filed on Dec. 18, 2020; the entire contents of which are incorporated herein by reference.

BACKGROUND

1. Field of the Invention

The present invention relates to rubber compositions for tires, and to tires using same.

2. Description of Related Art

Known rubber compositions for tires use silica as a filler to improve wet performance—a measure of how well the tire performs on wet roads—and low heat production—a property that contributes to the fuel economy. However, use of silica as a replacement for carbon black used as a reinforcement filler reduces the conductivity of the rubber composition. This makes the tire more susceptible to charge build up, which can cause electrostatic spark discharge, or malfunctioning of electronic components.

JP-A-2012-167216 discloses a conductive rubber composition in which a masterbatch prepared by adding a carbon nanotube to a rubber having a Mooney viscosity of 30 or less is mixed with a rubber having a Mooney viscosity of 30 or less to improve conductivity. JP-A-2010-275376 discloses mixing a crushed vapor-grown carbon fiber into a rubber composition containing a rubber reinforcement material blended into the rubber components. JP-A-2009-102630 discloses a rubber composition in which a vapor-grown carbon fiber having a fiber diameter of 20 to 120 nm, a fiber length of 2 to 20 µm, and an aspect ratio of 20 to 1,000 is mixed into the rubber components.

Japanese Patent Number 6499781 discloses a granular carbon nanotube obtained by coating a carbon nanotube with a binder rubber latex and granulating the binder-coated carbon nanotube to improve carbon nanotube properties such as ease of handling.

SUMMARY

Carbon nanotubes have the effect to greatly improve conductivity. However, when added and kneaded into a diene rubber, carbon nanotubes form aggregates, and the resulting large viscosity increase poses problems in the kneading process. This makes it difficult to improve conductivity with carbon nanotubes while retaining the low-heat-production performance of silica even with carbon nanotubes added into a rubber composition containing silica.

It is accordingly an object of an aspect of the present invention to provide a rubber composition for tires with which low heat production and conductivity can be achieved at the same time.

A first aspect of the present invention is a rubber composition for tires produced by kneading a diene rubber, silica, and a granular carbon nanotube prepared as a binder-coated, granulated carbon nanotube.

A second aspect of the present invention is a rubber composition for tires comprising a matrix-rubber-component diene rubber, silica, and a carbon nanotube coated with at least one selected from the group consisting of a rubber of a rubber latex, a liquid polymer, and a mineral oil.

A third aspect of the present invention is a tire comprising the rubber composition for tires of the first or second aspect of the present invention.

With an aspect of the present invention, low heat production and conductivity can be achieved at the same time while improving processability.

DESCRIPTION OF THE PREFERRED EMBODIMENTS

A rubber composition for tires according to an embodiment is a rubber composition produced by kneading a diene rubber, silica, and a granular carbon nanotube prepared as a binder-coated, granulated carbon nanotube.

The diene rubber as a matrix rubber component is not particularly limited, and various types of diene rubbers typically used for rubber compositions for tires may be used. Examples of such diene rubbers include natural rubber (NR), synthetic isoprene rubber (IR), polybutadiene rubber (BR), styrene-butadiene rubber (SBR), styrene-isoprene copolymer rubber, butadiene-isoprene copolymer rubber, and styrene-isoprene-butadiene copolymer rubber. These may be used alone, or two or more of these rubbers may be used in combination. Specific examples of these diene rubbers include modified diene rubbers that are modified by a functional group, such as an amino group or a hydroxyl group, introduced at the terminals of the molecule or in the chain of the molecule. Here, the matrix rubber component is a rubber component that constitutes a continuous phase in the rubber composition, and in which dispersoids such as fillers (e.g., silica) and granular carbon nanotubes are dispersed. It is to be noted that, when a diene rubber latex is used as a binder for granular carbon nanotubes, the rubber in the diene rubber latex is excluded from the meaning of the rubber contained as a matrix rubber component.

Preferably, the diene rubber as a matrix rubber component contains at least one selected from the group consisting of natural rubber, polybutadiene rubber, and styrene-butadiene rubber. More preferably, 100 parts by mass of the diene rubber contains 50 to 100 parts by mass of styrene-butadiene rubber and 0 to 50 parts by mass of natural rubber and/or polybutadiene rubber. In this case, the diene rubber may be solely styrene-butadiene rubber.

The silica is contained as a filler, and low heat production and wet performance can be improved in a good balance by containing silica. The silica is not particularly limited, and may be, for example, a wet silica such as precipitated silica or silica gel produced by a wet process.

The BET specific surface area of silica (measured in compliance with the BET method of JIS K6430) is not particularly limited, and may be, for example, 100 to 300 $m^2/g$, or 150 to 250 $m^2/g$.

Preferably, the silica content is 50 to 150 parts by mass relative to 100 parts by mass of the diene rubber representing a matrix rubber component. With a silica content of 50 parts by mass or more, the intended effect of silica to improve low heat production can improve, whereas processability can be maintained with a silica content of 150 parts by mass or less. The silica content is more preferably 60 to 120 parts by mass, even more preferably 60 to 100 parts by mass relative to 100 parts by mass of diene rubber.

In the rubber composition for tires according to the present embodiment, the filler preferably contains silica as a major component. The filler may be solely silica, or may be a combination of silica and carbon black. Preferably, more than 70 mass % of the filler is silica. More preferably, the filler is essentially carbon black free. Here, carbon nanotubes are excluded from the meaning of carbon black.

The rubber composition for tires according to the present embodiment may contain a silane coupling agent, in addition to silica. Examples of the silane coupling agent include sulfide silane and mercapto silane. The content of silane coupling agent is not particularly limited, and may be, for example, 2 to 20 mass % relative to the silica content.

The rubber composition for tires according to the present embodiment contains a granular carbon nanotube. The granular carbon nanotube is a granulated carbon nanotube coated with a binder, or more specifically, a granular material containing carbon nanotubes and a binder and prepared by granulating binder-coated nanotubes. This reduces scattering of carbon nanotubes, and ease of handling improves. There is also a reduced environmental or safety risk. By being coated with a binder, the carbon nanotubes form fewer aggregates, and provide desirable dispersibility by easily mixing into the diene rubber representing a matrix rubber component. In this way, the silica-containing rubber composition can achieve low heat production and conductivity at the same time while having improved processability.

The carbon nanotubes are tubes with a cylindrical structure of a graphite sheet of mainly six-membered carbon rings. Examples of the carbon nanotubes include monolayer carbon nanotubes (single-walled nanotubes), multilayer carbon nanotubes (multi-walled nanotubes), bilayer (double-walled nanotubes), and cup-stacked carbon nanotubes, and known carbon nanotubes may be used.

The fiber diameter (diameter) of carbon nanotubes is not particularly limited, and may be, for example, 0.1 to 300 nm, 1 to 200 nm, or 5 to 50 nm. The fiber length of carbon nanotubes is not particularly limited either, and may be, for example, 1 to 500 μm, 3 to 100 μm, or 5 to 50 μm.

The binder is a coating material for coating carbon nanotubes. The binder is required to at least partly coat the surface of a carbon nanotube, and is not necessarily required to cover the whole surface of a carbon nanotube. By being coated with a binder, carbon nanotubes can be granulated with the individual tubes adhering to each other. This makes it easier to handle the carbon nanotubes.

The granular carbon nanotubes may be disrupted either partly or entirely while being kneaded with the diene rubber, or may preserve the granular form before kneading without being disrupted. In an embodiment, the rubber composition after kneading may contain partially disrupted granular materials. That is, the binder may be a binder with adhesion weak enough to be partially or completely disrupted while being kneaded. By being disrupted while being kneaded, the binder can provide further improvement of dispersibility of carbon nanotubes in the diene rubber representing a matrix rubber component.

Preferred for use as the binder are, for example, a rubber latex, a liquid polymer, and a mineral oil. Specifically, the granular carbon nanotube is preferably one obtained by granulating a carbon nanotube coated with at least one binder selected from the group consisting of a rubber latex, a liquid polymer, and a mineral oil. In the granular carbon nanotube, the carbon nanotube is coated with at least one coating material selected from the group consisting of a rubber of a rubber latex, a liquid polymer, and a mineral oil, and the granular carbon nanotube is formed by granulating the carbon nanotube coated with these coating materials used as binders.

Examples of the rubber latex include diene rubber latexes such as a natural rubber latex, a polybutadiene latex, a styrene-butadiene copolymer latex, an acrylonitrile-butadiene copolymer latex, and a chloroprene rubber latex. The rubber in the diene rubber latex may be the same or different rubber from the diene rubber representing a matrix rubber component.

The liquid polymer is a polymer that is liquid at ordinary temperature (23° C.), and may be, for example, a polymer (including an oligomer) having a weight-average molecular weight Mw of 10,000 or less. Specific examples include polyethylene, silicone, and poly α-olefin.

Examples of the mineral oil include liquid paraffin, a paraffinic mineral oil, a naphthenic mineral oil, and an aromatic mineral oil.

The amount of binder relative to the carbon nanotubes is not particularly limited. For example, the amount of carbon nanotubes is preferably 100 to 5,000 parts by mass, more preferably 200 to 4,000 parts by mass, even more preferably 300 to 3,000 parts by mass, and may be 500 to 2,000 parts by mass, relative to 100 parts by mass of the binder.

The size of granular carbon nanotube is not particularly limited, and the granular carbon nanotubes may have an average particle diameter of, for example, 0.1 to 3.0 mm, 0.3 to 2.5 mm, or 0.5 to 2.0 mm. Here, the average particle diameter is an arithmetic average of particle diameters measured for 50 randomly extracted granular materials in microscopy.

The method of production of granular carbon nanotubes is not particularly limited. For example, when a rubber latex is used as a binder, the methods (A) to (C) described in Japanese Patent No. 6499781 may be used, as described below. The methods of production described in Japanese Patent No. 6499781 are hereby incorporated by reference.

Method (A)

Carbon nanotubes are mixed and stirred with water to prepare a dispersion, and a rubber latex is added and mixed into the dispersion. While stirring the resulting mixture, a water-insoluble solvent is dropped in the mixture to form granular materials by allowing the carbon nanotubes to migrate from the aqueous phase to the rubber phase. The granular materials are then separated from the aqueous phase, and the separated granular materials are dried.

Method (B)

A rubber latex is mixed and stirred with water to prepare a dispersion, and carbon nanotubes are added and mixed into the dispersion. While stirring the resulting mixture, a water-insoluble solvent is dropped in the mixture to form granular materials by allowing the carbon nanotubes to migrate from the aqueous phase to the rubber phase. The granular materials are then separated from the aqueous phase, and the separated granular materials are dried.

Method (C)

A rubber latex and carbon nanotubes are mixed and stirred with water, and a water-insoluble solvent is dropped in the resulting mixture to form granular materials by allowing the carbon nanotubes to migrate from the aqueous phase to the rubber phase. The granular materials are then separated from the aqueous phase, and the separated granular materials are dried.

Examples of the water-insoluble solvents used in these methods include toluene, xylene, hexane, tetrahydrofuran, benzene, cyclohexane, and carbon tetrachloride.

The content of granular carbon nanotubes in the rubber composition is not particularly limited, and may be, for example, 0.5 to 30 parts by mass, 1 to 25 parts by mass, or 2 to 20 parts by mass relative to 100 parts by mass of the diene rubber representing a matrix rubber component.

Preferably, the granular carbon nanotubes are added so that the volume fraction of carbon nanotubes in the rubber composition for tires is 0.5% to 5.0%. Here, the volume fraction is a volume fraction of carbon nanotubes in the rubber composition when the whole rubber composition for tires is taken as 100%. With a volume fraction of 0.5% or more, the carbon nanotubes can increase its effect to improve conductivity, whereas low heat production and processability can improve with a volume fraction of carbon nanotubes equal to or less than 5.0%. The volume fraction of carbon nanotubes is preferably 0.7% to 4.0%, more preferably 1.0% to 3.0%.

Aside from the foregoing components, the rubber composition for tires according to the present embodiment may contain various additives commonly used for rubber compositions, for example, such as zinc oxide, stearic acid, oil, wax, an age resister, a vulcanizing agent, and a vulcanization accelerator.

Preferred for use as a vulcanizing agent is sulfur. The content of vulcanizing agent is not particularly limited, and is preferably 0.1 to 10 parts by mass, more preferably 0.5 to 5 parts by mass relative to 100 parts by mass of the diene rubber representing a matrix rubber component.

Examples of the vulcanization accelerator include sulfenamide, thiuram, thiazole, guanidine, and dithiocarbamate vulcanization accelerators. These may be used alone, or two or more of these vulcanization accelerators may be used in combination. The content of vulcanization accelerator is not particularly limited, and is preferably 0.1 to 7 parts by mass, more preferably 0.5 to 5 parts by mass relative to 100 parts by mass of the diene rubber representing a matrix rubber component.

The rubber composition for tires according to the present embodiment may be produced by kneading a matrix-rubber-component diene rubber, silica, and a granular carbon nanotube. The additives may be added as optional components in kneading the rubber composition. For kneading, a mixing machine commonly used to prepare a rubber composition may be used, for example, such as a Banbury mixer, a kneader, or rolls, and the components may be kneaded following an ordinary method. For example, additives other than a vulcanizing agent and a vulcanization accelerator are added and mixed with the diene rubber, together with silica and granular carbon nanotubes in a first mixing step (non-productive mixing step). An unvulcanized rubber composition can then be prepared by adding and mixing the vulcanizing agent and the vulcanization accelerator to the mixture in a final mixing step (productive mixing step).

In the rubber composition for tires prepared in this fashion, the granular carbon nanotubes may retain the granular form before kneading, or may be partially disrupted, or may even be completely disrupted into a non-granular form, as mentioned above. The granular carbon nanotubes may have one of these forms, or two or more of these forms existing together. That is, the rubber composition for tires of an embodiment may be a rubber composition containing a matrix-rubber-component diene rubber, silica, and a carbon nanotube coated with at least one selected from the group consisting of a rubber derived from a rubber latex, a liquid polymer, and a mineral oil, and in which the carbon nanotube has a granular form, or a partially disrupted granular form or a completely disrupted non-granular form.

The rubber composition for tires according to the present embodiment can be used for tires of various applications and sizes, such as tires for passenger cars, and heavy load tires for trucks and buses. Other applicable areas include various parts of tires, such as the tread and side walls. The preferred use is a rubber for the tread of a tire, specifically, a rubber composition for the tread of a tire.

A tire according to the present embodiment is a tire produced by using the rubber composition for tires. The tire is preferably a pneumatic tire. In an embodiment, the tire may be a tire having a tread rubber made of the rubber composition. In an exemplary production of such tires, a tire member such as a tread rubber is made from the rubber composition using equipment such as a rubber extruder, and is combined with other tire members to prepare an unvulcanized tire (green tire), before vulcanization molding at, for example, 140 to 180° C.

The upper and lower limits of various numeric ranges, including contents and fiber diameters, may be freely combined, and all such combinations are deemed to be included as preferred numeric ranges in this specification.

EXAMPLES

The following describes Examples of the present invention. It is to be noted, however, that the present invention is not limited by the descriptions of the following Examples.

The components used in Examples and Comparative Examples are as follows.

SBR: Styrene-butadiene rubber, JSR1502 manufactured by JSR

BR: Polybutadiene rubber, UBEPOL BR150B manufactured by Ube Industries Ltd.

NR: Natural rubber, RSS #3

Silica 1: Nipsil AQ manufactured by Tosoh Silica Corporation; BET specific surface area: 205 $m^2/g$ Silica 2: ULTRASIL 9100GR manufactured by Evonik Industries; BET specific surface area: 235 $m^2/g$ Silane coupling agent: Si69 manufactured by Evonik Industries Oil: Process NC140 manufactured by ENEOS Corporation CNT: Carbon nanotube K-Nanos-100P manufactured by Kumho; fiber diameter: 8 to 15 nm, fiber length: 26 µm Carbon black: N339

Zinc oxide: Zinc White #1 manufactured by Mitsui Mining & Smelting Co., Ltd.

Stearic acid: Lunac S-20 manufactured by Kao Corporation

Wax: OZOACE0355 manufactured by Nippon Seiro Co., Ltd.

Age resister: N-Phenyl-N'-(1,3-dimethylbutyl)-p-phenylenediamine, Nocrac 6C manufactured by Ouchi Shinko Chemical Industrial Co., Ltd.

Sulfur: Sulfur manufactured by Tsurumi Chemical Industry Co., Ltd.

Vulcanization accelerator: Soxinol CZ manufactured by Sumitomo Chemical Co., Ltd.

Granular CNT 1: Granular carbon nanotube prepared using the following method in compliance with the methods described in Japanese Patent No. 6499781.

A homogenizer (10,000 rpm at maximum), and a portable mixer equipped with paddle vanes were set on a 10-L round stainless-steel vessel. After supplying 7.4 g of a natural rubber concentrated latex (manufactured by REGITEX Co., Ltd.; rubber concentration: 60 mass %) to 4,455 g of water, 45 g of CNT (K-Nanos-100P, manufactured by Kumho) was added in small divided portions while stirring the mixture at about 600 rpm. After adding the whole amount, the CNT was dispersed at about 6,000 rpm for 30 minutes with the homogenizer switched from the mixer. A few drops of the resulting dispersion were dropped on a glass plate with a dropper, and were spread over the glass plate with a spatula. The sample was then checked for the presence of undispersed clumps, both visually and sensorially with fingers. The inspection confirmed no undispersed clumps that were grainy in appearance and texture. Here, the CNT concentration was about 1 mass % relative to water, and the proportion of rubber (a solid rubber content in the rubber latex) to the CNT was about 10 mass %.

Thereafter, 400 g of toluene as a water-insoluble solvent was dropped for 20 minutes using an auto dropping device while stirring the dispersion at 700 rpm with the portable mixer switched from the homogenizer. This produced granular materials measuring about 1 mm in diameter. The granular materials were separated from water using a 60-mesh sieve, and naturally dried at ordinary temperature for about 20 hours in a fume hood. The granular materials were then heated to dry at 70 to 80° C. with a vacuum dryer until the solvent in the granular materials and the remaining water were reduced to 0.5 mass % or less of loss on heating at 150° C. for 1 hour. This produced Granular CNT 1.

Granular CNT 2

Granular CNT 2 was produced using the same method of preparation used for Granular CNT 1, except that 5.0 g of liquid paraffin (manufactured by Nacalai tesque) was used instead of 7.4 g of natural rubber concentrated latex.

Granular CNT 3

Granular CNT 3 was produced using the same method of preparation used for Granular CNT 1, except that 9.0 g of a styrene-butadiene copolymer latex (Roadex, manufactured by JSR; rubber concentration: 50 mass %) was used instead of 7.4 g of natural rubber concentrated latex.

Granular CNT 4

Granular CNT 4 was produced using the same method of preparation used for Granular CNT 1, except that K-Nanos-300P (a CNT manufactured by Kumho; fiber diameter: 8 to 28 nm, fiber length: 50 μm) was used instead of K-Nanos-100P (manufactured by Kumho).

First Example: Rubber Composition and Evaluations

In a first mixing step, compounding ingredients other than sulfur and a vulcanization accelerator were added and kneaded with the rubber components in the formulations (parts by mass) shown in Table 1, using a Banbury mixer (dump temperature=160° C.). In a final mixing step, sulfur and the vulcanization accelerator were added and kneaded with the kneaded material (dump temperature=90° C.) to prepare a rubber composition.

The rubber composition was evaluated for processability. Separately, the rubber composition was vulcanized at 160° C.×30 minutes to prepare a test piece of a predetermined shape, and the test piece was used for evaluations of low heat production and conductivity. The measurement and evaluation methods are as follows. The results are presented in Table 1. In Table 1, "Silica (volume %)" and "CNT (volume %)" represent the volume fractions of silica and carbon nanotubes, respectively, in the rubber composition.

Processability

The unvulcanized rubber was pre-heated at 100° C. for 1 minute. After 4 minutes, the torque was measured in Mooney units using a rotor-less Mooney Measurement Device (manufactured by Toyo Seiki Seisaku-sho Ltd.), in compliance with JIS K6300. The measured values were presented as indices relative to the value of Comparative Example 1 taken as 100. Smaller indices mean lower Mooney viscosities and better processability.

Low Heat Production

The test piece was measured for loss factor tan δ at 10 Hz frequency, 10% static strain, 2% dynamic strain, and 70° C. in compliance with JIS K6394. The measured values were presented as indices relative to the value of Comparative Example 1 taken as 100. Smaller indices mean smaller tan δ, meaning that the rubber composition is less likely to generate heat, or more desirable in terms low heat production (better fuel economy).

Conductivity

The test piece was measured for electrical volume resistance using a Hiresta-UP manufactured by Mitsubishi Chemical Analytics. By taking common logarithms of the measured values, the results were presented as indices relative to the value of Comparative Example 1 taken as 100. Smaller indices mean smaller electrical resistances and better conductivity.

TABLE 1

| | Com. Ex. 1 | Com. Ex 2 | Ex. 1 | Ex. 2 | Ex. 3 | Ex. 4 | Ex. 5 | Ex. 6 | Ex. 7 |
|---|---|---|---|---|---|---|---|---|---|
| Formulation (parts by mass) | | | | | | | | | |
| SBR | 100 | 100 | 100 | 100 | 100 | 100 | 100 | 100 | 100 |
| Silica 1 | 60 | 60 | 60 | 60 | 60 | 60 | 60 | 60 | 60 |
| Silane coupling agent | 6.0 | 6.0 | 6.0 | 6.0 | 6.0 | 6.0 | 6.0 | 6.0 | 6.0 |
| Oil | 10 | 10 | 10 | 10 | 10 | 10 | 10 | 10 | 10 |
| CNT | 6.0 | — | — | — | — | — | — | — | — |
| Carbon black | — | 10.0 | — | — | — | — | — | — | — |
| Granular CNT 1 | — | — | 7.0 | 3.4 | 10.0 | 15.2 | — | — | — |
| Granular CNT 2 | — | — | — | — | — | — | 7.0 | — | — |
| Granular CNT 3 | — | — | — | — | — | — | — | 7.0 | — |
| Granular CNT 4 | — | — | — | — | — | — | — | — | 7.0 |
| Zinc oxide | 3.0 | 3.0 | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 | 2.0 | 2.0 |
| Wax | 2.0 | 2.0 | 2.0 | 2.0 | 2.0 | 2.0 | 2.0 | 2.0 | 2.0 |
| Age resister | 2.0 | 2.0 | 2.0 | 2.0 | 2.0 | 2.0 | 2.0 | 2.0 | 2.0 |
| Sulfur | 1.5 | 1.5 | 1.5 | 1.5 | 1.5 | 1.5 | 1.5 | 1.5 | 1.5 |
| Vulcanization accelerator | 1.8 | 1.8 | 1.8 | 1.8 | 1.8 | 1.8 | 1.8 | 1.8 | 1.8 |

TABLE 1-continued

|  | Com. Ex. 1 | Com. Ex 2 | Ex. 1 | Ex. 2 | Ex. 3 | Ex. 4 | Ex. 5 | Ex. 6 | Ex. 7 |
|---|---|---|---|---|---|---|---|---|---|
| Silica (volume %) | 18.5 | 18.3 | 18.5 | 18.7 | 18.3 | 18.2 | 18.5 | 18.5 | 18.5 |
| CNT (volume %) | 2.0 | 0.0 | 2.1 | 1.0 | 3.0 | 4.5 | 2.1 | 2.1 | 2.1 |
| Evaluation (index) | | | | | | | | | |
| Processability | 100 | 72 | 90 | 82 | 95 | 99 | 88 | 87 | 92 |
| Low heat production | 100 | 83 | 90 | 86 | 95 | 98 | 90 | 87 | 88 |
| Conductivity | 100 | 180 | 75 | 95 | 65 | 60 | 70 | 78 | 78 |

As shown in Table 1, in contrast to Comparative Example 1 in which the carbon nanotubes were added without modification, the viscosity of unvulcanized rubber was smaller and provided better processability, and low heat production and conductivity both improved in Examples 1 to 7 in which the carbon nanotubes were coated with the binder rubber latex, and granulated to form granular carbon nanotubes. Comparative Example 2 in which carbon black was mixed instead of carbon nanotubes showed improved processability and improved low heat production compared to Comparative Example 1. However, the conductivity was greatly impaired.

A microscope observation (30×) of a rubber cross section from the rubber composition of Example 1 after vulcanization confirmed that the carbon nanotubes existed not in the granular form that was present before kneading, but in partially disrupted granular form, or in other words, in the form of smaller grains occurring as a result of disruption of the original granular form.

Second Example: Rubber Composition and Evaluations

A rubber composition was prepared in the same manner as in First Example, except that silica and other components were added in increased amounts according to the formulations (parts by mass) shown in Table 2. A test piece prepared from the rubber composition was then evaluated for processability, low heat production, and conductivity. The measurement and evaluation methods are as described above. The results are presented as indices relative to the values of Comparative Example 3 taken as 100.

TABLE 2

|  | Com. Ex. 3 | Ex. 8 | Ex. 9 | Ex. 10 | Ex. 11 | Ex. 12 |
|---|---|---|---|---|---|---|
| Formulation (parts by mass) | | | | | | |
| SBR | 100 | 100 | 100 | 100 | 100 | 100 |
| Silica 1 | 100 | 100 | 100 | 100 | 100 | 100 |
| Silane coupling agent | 10.0 | 10.0 | 10.0 | 10.0 | 10.0 | 10.0 |
| Oil | 20 | 20 | 20 | 20 | 20 | 20 |
| CNT | 7.2 | — | — | — | — | — |
| Granular CNT 1 | — | 8.0 | 4.0 | 12.2 | 18.5 | — |
| Granular CNT 2 | — | — | — | — | — | 8.0 |
| Zinc oxide | 3.0 | 3.0 | 3.0 | 3.0 | 3.0 | 3.0 |
| Stearic acid | 2.0 | 2.0 | 2.0 | 2.0 | 2.0 | 2.0 |
| Wax | 2.0 | 2.0 | 2.0 | 2.0 | 2.0 | 2.0 |
| Age resister | 2.0 | 2.0 | 2.0 | 2.0 | 2.0 | 2.0 |
| Sulfur | 1.5 | 1.5 | 1.5 | 1.5 | 1.5 | 1.5 |
| Vulcanization accelerator | 1.8 | 1.8 | 1.8 | 1.8 | 1.8 | 1.8 |
| Silica (volume %) | 25.4 | 25.3 | 25.6 | 25.1 | 24.9 | 25.3 |
| CNT (volume %) | 2.0 | 2.0 | 1.0 | 3.0 | 4.5 | 2.0 |
| Evaluation (index) | | | | | | |
| Processability | 100 | 88 | 83 | 96 | 99 | 87 |
| Low heat production | 100 | 91 | 87 | 96 | 99 | 89 |
| Conductivity | 100 | 75 | 94 | 65 | 60 | 70 |

As shown in Table 2, in contrast to Comparative Example 3 in which the carbon nanotubes were added without modification, the viscosity of unvulcanized rubber was smaller and provided better processability, and low heat production and conductivity both improved in Examples 8 to 12 in which the granular carbon nanotubes were used as in First Example, despite the increased silica content.

Third Example: Rubber Composition and Evaluations

A rubber composition was prepared in the same manner as in First Example, except that silica and other components were added in increased amounts according to the formulations (parts by mass) shown in Table 3. A test piece prepared from the rubber composition was then evaluated for processability, low heat production, and conductivity. The measurement and evaluation methods are as described above. The results are presented as indices relative to the values of Comparative Example 4 taken as 100.

TABLE 3

|  | Com. Ex. 4 | Ex. 13 |
|---|---|---|
| Formulation (parts by mass) | | |
| SBR | 100 | 100 |
| Silica 1 | 140 | 140 |
| Silane coupling agent | 14.0 | 14.0 |
| Oil | 30 | 30 |
| CNT | 8.2 | — |
| Granular CNT 1 | — | 9.2 |
| Zinc oxide | 3.0 | 3.0 |
| Stearic acid | 2.0 | 2.0 |
| Wax | 2.0 | 2.0 |
| Age resister | 2.0 | 2.0 |
| Sulfur | 1.5 | 1.5 |
| Vulcanization accelerator | 1.8 | 1.8 |
| Silica (volume %) | 30.2 | 30.2 |
| CNT (volume %) | 2.0 | 2.0 |
| Evaluation (index) | | |
| Processability | 100 | 91 |
| Low heat production | 100 | 92 |
| Conductivity | 100 | 75 |

As shown in Table 3, in contrast to Comparative Example 4 in which the carbon nanotubes were added without modification, the viscosity of unvulcanized rubber was smaller and provided better processability, and low heat production and conductivity both improved in Example 13 in which the granular carbon nanotubes were used as in First Example, despite the even higher silica content.

Fourth Example: Rubber Composition and Evaluations

A rubber composition was prepared in the same manner as in First Example, except that a different type of silica was used in the formulations (parts by mass) shown in Table 4. A test piece prepared from the rubber composition was then evaluated for processability, low heat production, and conductivity. The measurement and evaluation methods are as described above. The results are presented as indices relative to the values of Comparative Example 5 taken as 100.

TABLE 4

|  | Com. Ex. 5 | Ex. 14 |
|---|---|---|
| Formulation (parts by mass) |  |  |
| SBR | 100 | 100 |
| Silica 2 | 90 | 90 |
| Silane coupling agent | 9.0 | 9.0 |
| Oil | 18 | 18 |
| CNT | 7.0 | — |
| Granular CNT 1 | — | 7.8 |
| Zinc oxide | 3.0 | 3.0 |
| Stearic acid | 2.0 | 2.0 |
| Wax | 2.0 | 2.0 |
| Age resister | 2.0 | 2.0 |
| Sulfur | 1.5 | 1.5 |
| Vulcanization accelerator | 1.8 | 1.8 |
| Silica (volume %) | 23.9 | 23.8 |
| CNT (volume %) | 2.0 | 2.0 |
| Evaluation (index) |  |  |
| Processability | 100 | 89 |
| Low heat production | 100 | 90 |
| Conductivity | 100 | 75 |

As shown in Table 4, in contrast to Comparative Example 5 in which the carbon nanotubes were added without modification, the viscosity of unvulcanized rubber was smaller and provided better processability, and low heat production and conductivity both improved in Example 14 in which the granular carbon nanotubes were used as in First Example, despite that silica 2 of a smaller particle size was used.

Fifth Example: Rubber Composition and Evaluations

A rubber composition was prepared in the same manner as in First Example, except that different diene rubber components were used in the formulations (parts by mass) shown in Table 5. A test piece prepared from the rubber composition was then evaluated for processability, low heat production, and conductivity. The measurement and evaluation methods are as described above. The results are presented as indices relative to the values of Comparative Example 6 taken as 100.

TABLE 5

|  | Com. Ex. 6 | Ex. 15 |
|---|---|---|
| Formulation (parts by mass) |  |  |
| SBR | 60 | 60 |
| BR | 40 | 40 |
| Silica 1 | 60 | 60 |
| Silane coupling agent | 6.0 | 6.0 |
| Oil | 10 | 10 |
| CNT | 6.0 | — |
| Granular CNT 1 | — | 7.0 |
| Zinc oxide | 3.0 | 3.0 |
| Stearic acid | 2.0 | 2.0 |
| Wax | 2.0 | 2.0 |
| Age resister | 2.0 | 2.0 |
| Sulfur | 1.5 | 1.5 |
| Vulcanization accelerator | 1.8 | 1.8 |
| Silica (volume %) | 18.5 | 18.5 |
| CNT (volume %) | 2.0 | 2.1 |
| Evaluation (index) |  |  |
| Processability | 100 | 92 |
| Low heat production | 100 | 92 |
| Conductivity | 100 | 80 |

As shown in Table 5, in contrast to Comparative Example 6 in which the carbon nanotubes were added without modification, the viscosity of unvulcanized rubber was smaller and provided better processability, and low heat production and conductivity both improved in Example 15 in which the granular carbon nanotubes were used as in First Example, despite that a blended mixture of diene rubbers SBR and BR was used as a matrix rubber component.

Sixth Example: Rubber Composition and Evaluations

A rubber composition was prepared in the same manner as in First Example, except that different diene rubber components were used in the formulations (parts by mass) shown in Table 6. A test piece prepared from the rubber composition was then evaluated for processability, low heat production, and conductivity. The measurement and evaluation methods are as described above. The results are presented as indices relative to the values of Comparative Example 7 taken as 100.

TABLE 6

|  | Com. Ex. 7 | Ex. 16 |
|---|---|---|
| Formulation (parts by mass) |  |  |
| SBR | 60 | 60 |
| NR | 40 | 40 |
| Silica 1 | 60 | 60 |
| Silane coupling agent | 6.0 | 6.0 |
| Oil | 10 | 10 |
| CNT | 6.0 | — |
| Granular CNT 1 | — | 7.0 |
| Zinc oxide | 3.0 | 3.0 |
| Stearic acid | 2.0 | 2.0 |
| Wax | 2.0 | 2.0 |
| Age resister | 2.0 | 2.0 |
| Sulfur | 1.5 | 1.5 |
| Vulcanization accelerator | 1.8 | 1.8 |

TABLE 6-continued

|  | Com. Ex. 7 | Ex. 16 |
| --- | --- | --- |
| Silica (volume %) | 18.5 | 18.5 |
| CNT (volume %) | 2.0 | 2.1 |
| Evaluation (index) | | |
| Processability | 100 | 88 |
| Low heat production | 100 | 87 |
| Conductivity | 100 | 70 |

As shown in Table 6, in contrast to Comparative Example 7 in which the carbon nanotubes were added without modification, the viscosity of unvulcanized rubber was smaller and provided better processability, and low heat production and conductivity both improved in Example 16 in which the granular carbon nanotubes were used as in First Example, despite that a blended mixture of diene rubbers SBR and NR was used as a matrix rubber component.

While there have been described certain embodiments of the invention, it will be understood that the embodiments are illustrative, and are not intended to limit the scope of the invention. These embodiments may be implemented in many modifications, and various omissions, replacements, and changes may be made thereto within the gist of the invention. It is intended that the embodiments and all such modifications, including omissions, replacements, and changes, made thereto fall within the scope and the gist of the invention, and in the invention set forth in the appended claims and equivalents thereto.

What is claimed is:

1. A rubber composition for tires produced by kneading a diene rubber, silica, and a granular carbon nanotube prepared as a binder-coated, granulated carbon nanotube, wherein the granular carbon nanotube is a granulated carbon nanotube coated with at least one binder selected from the group consisting of a rubber latex, a polymer which is liquid at 23° C., and a mineral oil.

2. The rubber composition for tires according to claim 1, wherein the amount of the carbon nanotube is 0.5% to 5.0% of the rubber composition for tires in terms of a volume fraction.

3. The rubber composition for tires according to claim 1, wherein the amount of the silica is 50 to 150 parts by mass relative to 100 parts by mass of the diene rubber in the rubber composition.

4. The rubber composition for tires according to claim 1, wherein 100 parts by mass of the diene rubber comprises styrene-butadiene rubber alone, or comprises 50 to 100 parts by mass of styrene-butadiene rubber and 0 to 50 parts by mass of natural rubber and/or polybutadiene rubber.

5. A tire comprising the rubber composition for tires of claim 1.

6. A rubber composition for tires, comprising:
a diene rubber as a matrix rubber component;
silica; and
a carbon nanotube coated with at least one selected from the group consisting of a rubber of a rubber latex, a polymer which is liquid at 23° C., and a mineral oil.

7. The rubber composition for tires according to claim 6, wherein the amount of the carbon nanotube is 0.5% to 5.0% of the rubber composition for tires in terms of a volume fraction.

8. The rubber composition for tires according to claim 6, wherein 100 parts by mass of the diene rubber comprises styrene-butadiene rubber alone, or comprises 50 to 100 parts by mass of styrene-butadiene rubber and 0 to 50 parts by mass of natural rubber and/or polybutadiene rubber.

9. The rubber composition for tires according to claim 6, wherein the amount of the silica is 50 to 150 parts by mass relative to 100 parts by mass of the diene rubber.

10. A tire comprising the rubber composition for tires of claim 6.

* * * * *